United States Patent [19]
Heath

[11] Patent Number: 4,773,358
[45] Date of Patent: Sep. 27, 1988

[54] MANIFOLD INTAKE ARRANGEMENT FOR INTERNAL COMBUSTION ENGINES

[76] Inventor: Kenneth E. Heath, 4504 Wayne Dr., Greenfield, Ind. 46140

[21] Appl. No.: 826,073

[22] Filed: Feb. 4, 1986

[51] Int. Cl.$^4$ .............................................. F02B 75/26
[52] U.S. Cl. .................. 123/58 R; 123/188 GC; 123/90.67; 123/52 MF
[58] Field of Search .......... 123/51 B, 51 BA, 51 BD, 123/26, 292, 316, 188 GC, 90.67, 52 MF, 51 A, 58 R

[56] References Cited

U.S. PATENT DOCUMENTS

| | | |
|---|---|---|
| 1,077,956 | 11/1913 | Fox . |
| 1,889,641 | 11/1932 | Dainton . |
| 1,914,707 | 6/1933 | Wolf . |
| 1,975,837 | 10/1934 | Ford ............................ 123/188 GC |
| 2,311,254 | 2/1943 | Raybon . |
| 2,334,917 | 11/1943 | Ford . |
| 2,396,347 | 3/1946 | Sanders ........................ 123/188 GC |
| 2,530,884 | 11/1950 | Laraque . |
| 2,878,799 | 3/1959 | Brenneke . |
| 3,046,961 | 7/1962 | Dolza . |
| 3,333,578 | 8/1967 | Muller . |
| 3,345,976 | 10/1967 | Pope et al. ................... 123/188 GC |
| 3,742,712 | 7/1973 | Garcea ........................ 123/188 GC |
| 4,149,493 | 4/1979 | Franke .............................. 123/26 |
| 4,232,641 | 11/1980 | Curtil ............................... 123/316 |
| 4,356,798 | 11/1982 | Sakaoka et al. . |
| 4,475,510 | 10/1984 | Asaka et al. ....................... 123/26 |
| 4,528,958 | 7/1985 | Yoshida et al. . |

FOREIGN PATENT DOCUMENTS

262070 6/1949 Switzerland ........................ 123/316
360496 11/1931 United Kingdom .

Primary Examiner—Charles J. Myhre
Assistant Examiner—David A. Okonsky
Attorney, Agent, or Firm—Jeffers, Hoffman & Niewyk

[57] ABSTRACT

An intake manifold arrangement for internal combustion engines whereby the combustion chamber can be supercharged without the use of mechanical gears and/or pumps. A pressure chamber is mounted upon the combustion chamber and communicates with the combustion chamber and an air and fuel mixture supply. A check valve for selectively allowing the mixture to enter the pressure chamber is provided between the air and fuel supply and the pressure chamber. At the connection between the pressure chamber and the combustion chamber, an intake valve for selectively allowing the mixture within the pressure chamber to enter the combustion chamber and reenter the pressure chamber during the initial portion of the compression stroke is provided. The check valve allows the fuel and air mixture to travel therethrough into the pressure chamber and the compression chamber only during a portion of the intake stroke when a vacuum is present. An exhaust boost or scavenging arrangement is provided whereby pressurized air is selectively forced into the combustion chamber at approximately halfway between bottom and top dead center piston locations during the exhaust stroke after bottom dead center and until the piston travels approximately halfway between top dead center and bottom dead center.

13 Claims, 4 Drawing Sheets

MANIFOLD INTAKE ARRANGEMENT FOR INTERNAL COMBUSTION ENGINES

BACKGROUND OF THE INVENTION

This invention relates generally to four cycle internal combustion engines and more particularly to an intake manifold arrangement for supercharging the combustion chamber without the use of gears, impellers and/or mechanical pump. More specifically, the invention is directed to an intake manifold arrangement wherein the air and fuel supply first travels through an adjustable check valve, a pressure chamber and then through the intake valve and into the combustion chamber.

In the past, supercharging of a combustion chamber has been done by using various mechanical pumps to pressurize the air and fuel mixture prior to its entering the combustion chamber. This method of supercharging, however, must use a portion of the engine output power to drive the gears, impellers, and/or mechanical pumps. Accordingly, the overall efficiency of the supercharged engine is decreased. A disadvantage to mechanical pump-type superchargers is that they are often mechanically complex and subject to failure. In the case of exhaust gas driven superchargers, oil tends to cake on the impeller bearings if not properly cooled down before shutting off the engine.

Furthermore, in the past, preheating of the fuel and air mixture has been done externally of the combustion chamber where the temperatures for heating the fuel and air mixture are lower than the temperature of the combustion chamber wall and the immediate vicinity. Thus, the fuel and air mixture has not been heated and vaporized to the fullest extent possible whereby it can be burned in the most efficient manner. Accordingly, internal combustion engines have not been efficient due to inefficient burning of fuel. Many prior art fuel preheaters require an external source of energy, such as battery powered electrical heating elements.

In conventional engines, the spent fuel within the combustion chamber is exhausted by the pistons traveling to top dead center during the exhaust stroke. In some cases, as shown in U.S. Pat. No. 3,046,961, residual exhaust gases have been removed from the combustion chamber by a charge of fresh air being forced into the combustion chamber substantially at the top thereof at about the top dead center position of the piston. As can be appreciated, this is not very efficient because the charge of air introduced at the top of the cylinder near top dead center does not necessarily cause exhaust gases near the piston, during the beginning of the exhaust stroke, to exit through the exhaust valve.

SUMMARY OF THE INVENTION

It is the principal object of the invention to overcome the above-discussed disadvantages associated with earlier internal combustion engines utilizing supercharging devices and air scavenging methods for removing residual exhaust gases from within the combustion chamber. It is also the object of this invention to provide a structure whereby the above-discussed disadvantages can be overcome in an economical manner.

The objects of the invention are obtained, in a preferred form of the invention, by providing a pressure chamber mounted directly upon the combustion chamber and communicating with the combustion chamber and the air and fuel supply. At the connection between the air and fuel supply and the pressure chamber, there is provided an adjustable check valve for selectively allowing the air-fuel mixture to enter the pressure chamber. At the port between the pressure chamber and the combustion chamber, there is provided a conventional intake valve for allowing the mixture within the pressure chamber to enter the combustion chamber and thereafter reenter the pressure chamber. The intake valve is controlled such that is opens at the start of the intake stroke and closes at substantially halfway between top dead center and bottom dead center during the compression stroke. The check valve admits fuel and air mixture to the pressure chamber only during the portion of the intake stroke when a vacuum is present.

The objects of the invention are further obtained by providing an air port on the side of the cylinder wall leadng into the combustion chamber substantially halfway between the top dead center and bottom dead center piston positions. The air port communicates with a pressurized air supply via an on/off air valve. The air valve is controlled so that it opens and forces air to flow through the port into the combustion chamber starting at the beginning of the exhaust stroke and until the piston is near the air port.

The invention, in one form thereof, is an engine having an intake manifold arrangement comprising a pressure chamber and a first valve for selective communication between the pressure chamber and the combustion chamber. A second valve provides selective communication between the pressure chamber and a fuel and air mixture supply. An intake control mechanism opens the first valve during the intake stroke and closes the first valve during the compression stroke after the bottom dead center position of the piston stroke.

The invention, in one form thereof, comprises an intake manifold arrangement wherein a pressure chamber is integrally connected between the combustion chamber and a fuel and air mixture intake line. A check valve is located between the pressure chamber and the intake line so as to allow the mixture to flow only into the pressure chamber. An intake valve is located between the pressure chamber and the cylinder and is controlled by an intake control means which opens the intake valve during the intake stroke and closes it during the compression stroke after bottom dead center. Thus, the pressure chamber is pressurized during a portion of the compression stroke after bottom dead center and before the closing of the intake valve.

The invention, in one form thereof, comprises a process for supercharging the combustion chamber of an internal combustion engine with the following steps: opening the intake valve so as to provide communication between the combustion chamber and a pressure chamber during the intake stroke; creating a vacuum within the combustion chamber and the pressure chamber during the intake stroke; opening a check valve so as to provide communication between the pressure chamber and a fuel and air supply and allowing fuel and air to be drawn into the pressure chamber and the combustion chamber; compressing the fuel and air within the pressure chamber and the combustion chamber during an initial portion of the compression stroke; closing the intake valve after the initial portion of the compression stroke; and finally, reopening the intake valve during the next intake stroke thereby supercharging the combustion chamber with the previously compressed air and fuel within the pressure chamber.

BRIEF DESCRIPTION OF THE DRAWINGS

The above-mentioned and other features and objects of this invention and the manner of obtaining them will become more apparent and the invention itself will be better understood by reference to the following description of an embodiment of the invention taken in conjunction with the accompanying drawings wherein.

Corresponding reference characters indicate corresponding parts throughout the several views of the drawings.

The exemplifications set out herein illustrate a preferred embodiment of the invention in one form thereof and such exemplifications are not to be construed as limiting the scope of the disclosure or the scope of the invention in any manner.

DETAILED DESCRIPTION OF THE PREFERRED EMBODIMENT

Figure 1:
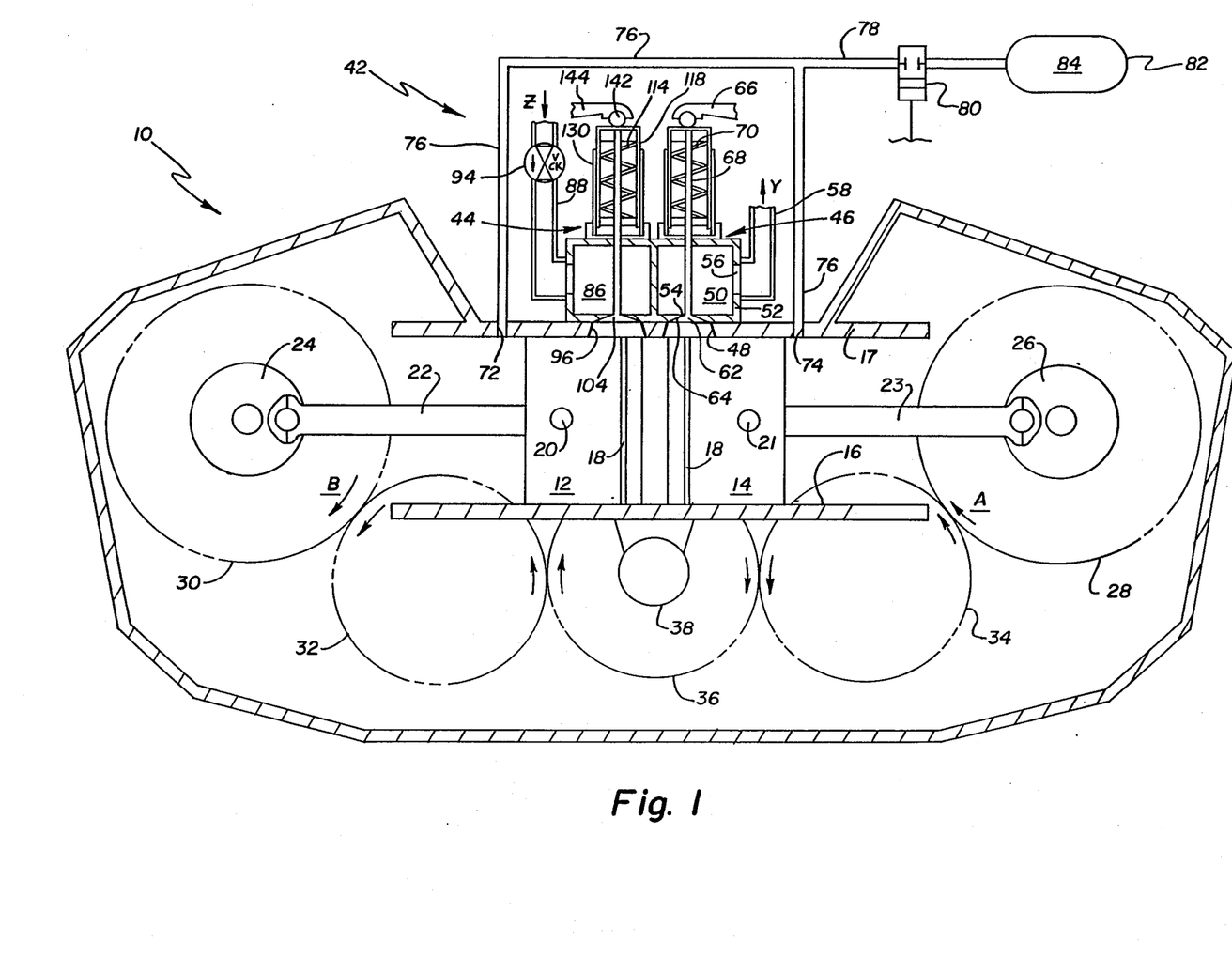
FIG. 1 is a cross-sectional elevational view of a preferred embodiment of the engine according to the present invention.

Referring to FIG. 1, there is generally shown a double opposing piston internal combustion engine 10 according to a preferred embodiment of the invention. Engine 10 has a combustion chamber 16 in which there is located power piston 12 and power piston 14. Power pistons 12 and 14 have a piston ring 18 connected thereto in a known and customary manner. Power piston 14 is connected to connecting rod 23 via piston pin 21. Connecting rod 23 is, in turn, connected to side crankshaft 26. Crankshaft 26 is coupled with side gear 28 and is adapted to rotate clockwise as shown by arrow A. Power piston 12 is connected to connecting rod 22 via piston pin 20. Connecting rod 22, in turn, is connected to side crankshaft 24. Crankshaft 24 is coupled with side gear 30 which is adapted to turn in a clockwise direction as shown by arrow B. Side gear 30 is coupled with and drives intermediate gear 32 which, in turn, is coupled with and drives power gear 36. On the right hand side thereof, side gear 28 is coupled with and drives intermediate gear 34 which, in turn, is coupled with and drives power gear 36. Power gear 36 is coaxially coupled with power shaft 38 which may be connected to a work load. Pistons 12 and 14, side gears 28 and 30, intermediate gears 32 and 34, and power gear 36 are all located within engine housing 40. Within engine housing 40 there is provided lubricating oil in a known manner for lubricating the pistons and gears and any other moving parts located therein.

Engine 10 utilizes a manifold arrangement generally indicated by 42. As shown in FIGS. 1 and 3a-3e, manifold arrangement 42 is made up of an intake arrangement generally indicated by 44 and an exhaust arrangement generally indicated by 46. Exhaust manifold arrangement 46 has an exhaust chamber 50 comprising chamber walls 52. Exhaust chamber 50 communicates with combustion chamber 16 via frusto-conical bore 48 located within combustion chamber wall 17 and through exhaust chamber valve port 54 located within exhaust chamber wall 52. Exhaust chamber 50 also communicates with exhaust pipe 58 via exhaust port 56 located within exhaust chamber wall 52. During the exhaust stroke, exhaust gases travel from within combustion chamber 16 to exhaust chamber 50 and then through exhaust pipe 58 into the atmosphere as indicated by arrow Y.

Exhaust gases within combustion chamber 16 are selectively allowed to enter exhaust chamber 50 by selectively pushing exhaust valve seating portion 62 off of and out of contact of exhaust valve seat 64 located within exhaust chamber wall 52. Exhaust valve seating portion 62 is selectively pushed off of valve seat 64 by a cam coupled with power shaft 38 (not shown) and with rocker arm 66 which is forced to selectively push valve stem 68 downwardly and against the force provided by spring 70. The mechanical valve components below rocker arm 66 are identical to the mechanical valve components utilized with intake manifold arrangement 44 and thus will be discussed hereinbelow with respect to intake manifold arrangement 44. The selective opening of the exhaust valve with respect to the locations of power pistons 12 and 14 will also be discussed below.

Figure 3A:
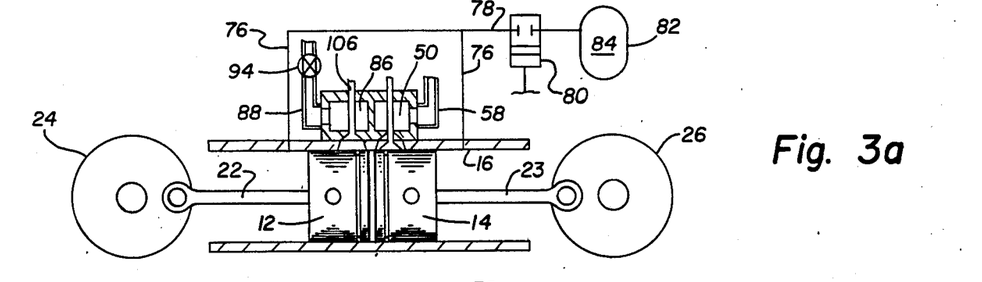
FIG. 3a is a diagrammatic partial cross-sectional view of the engine of FIG. 1 showing the pistons located in a top dead center position prior to the exhaust valve closing.
Figure 3B:
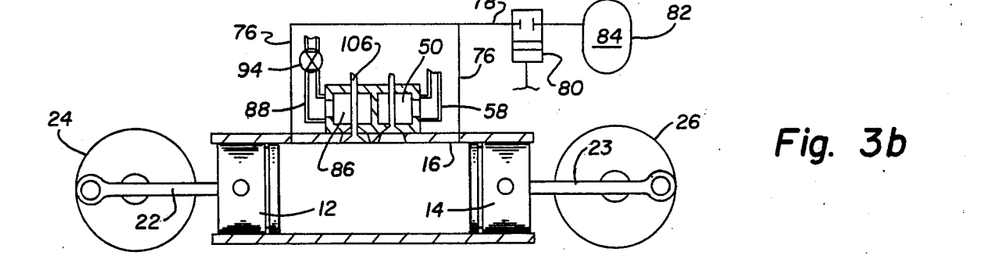
FIG. 3b is a diagrammatic partial cross-sectional view of the engine of FIG. 1 showing the pistons at bottom dead center after the compression stroke and showing the intake valve in an open position.
Figure 3C:
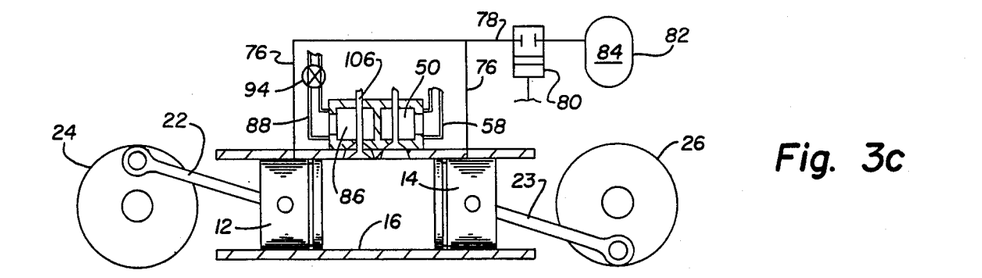
FIG. 3c is a diagrammatic partial cross-sectional view of the engine of FIG. 1 showing the pistons substantially halfway between bottom and top dead center positions just prior to the closing of the intake valve.
Figure 3D:
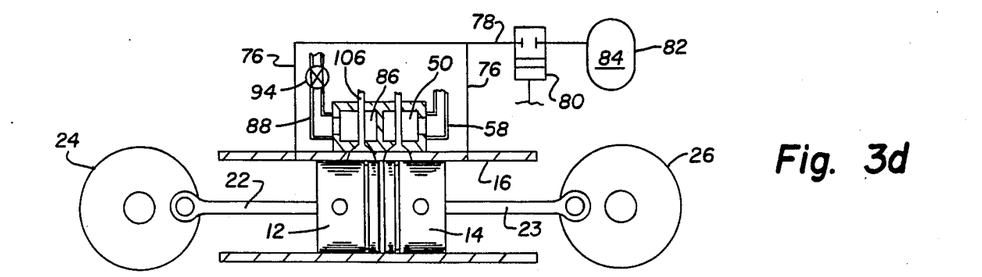
FIG. 3d is a diagrammatic partial cross-sectional view of the engine of FIG. 1 showing the pistons in a top dead center position prior to the power stroke.
Figure 3E:
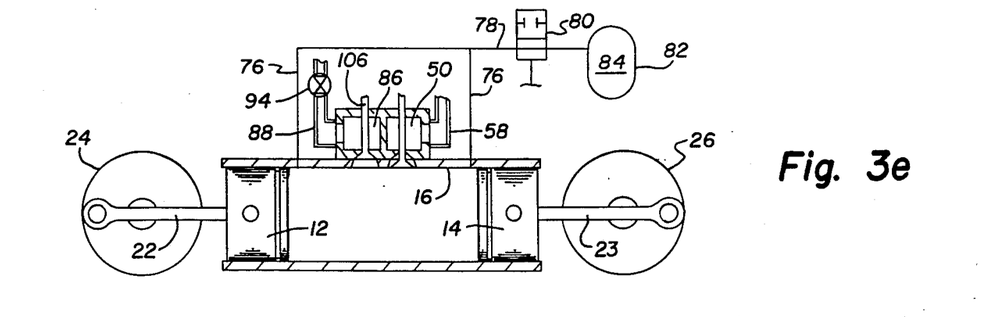
FIG. 3e is a diagrammatic partial cross-sectional view of the engine of FIG. 1 showing the pistons in a bottom dead center position just prior to the exhaust stroke and showing the exhaust valve and fresh air valve in open positions.

To assist the quick and efficient clearing of exhaust gases within combustion chamber 16, after the power stroke, an exhaust boost or scavenging arrangement is provided as shown in FIGS. 1 and 3a-3e. More specifically, air holes 72 and 74 are provided on the side of combustion chamber 16 substantially halfway between top dead center and bottom dead center positions of power pistons 12 and 14. Air holes 72 and 74 communicate with air lines 76 which "T" into air line 78. Air line 78 is connected to schematically shown on/off air valve 80 which communicates with pressure vessel 82 having therein pressurized air 84. Air valve 80 is coupled with a camming arrangement which is coupled with power shaft 38 (not shown) so as to selectively open and close air valve 80 with respect to the position of power pistons 12 and 14. Air valve 80, in FIG. 1, is shown in the closed position wherein pressurized air 84 within vessel 82 is prohibited from traveling via air lines 78 and 76 to within combustion chamber 16. In FIG. 3e, air valve 80 is shown in the open position whereat pressurized air 84 within vessel 82 is allowed to travel through lines 78 and 76 through air holes 72 and 74 thereby assisting exhaust gases within combustion chamber 16 to flow out therefrom through exhaust chamber 50 and exhaust pipe 58.

Figure 2:
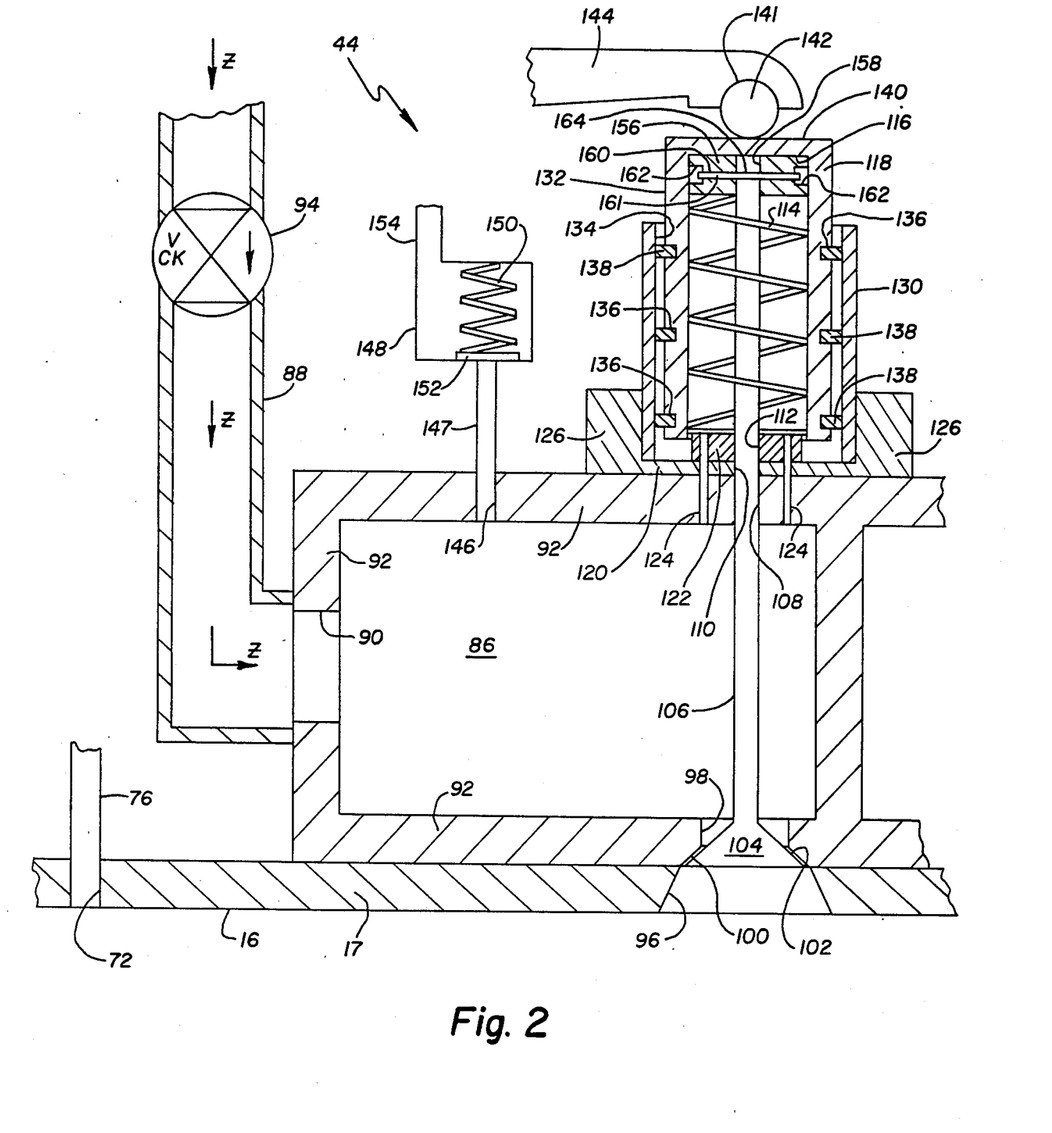
FIG. 2 is an enlarged fragmentary cross-sectional view of the intake manifold arrangement shown in FIG. 1.

Referring now to FIGS. 1 and 2, there is an intake manifold arrangement 44 wherein intake pressure chamber 86 communicates with intake air and fuel supply line 88 via intake chamber bore 90 located within intake chamber wall 92. Air and fuel supply line 88 is provided with adjustable check valve 94 which allows the air and fuel mixture to flow only in the direction of the arrows indicated by Z. Adjustable check valve 94 allows the air/fuel mixture to flow therethrough only when a vacuum is present within intake pressure chamber 86. Check valve 94 is adjustable so that is will open only upon the occurrence of a preset vacuum within intake pressure chamber 86.

Intake pressure chamber 86 also communicates with combustion chamber 16 via valve bore 98 located within chamber wall 92 and through frusto-conical bore 96 located within combustion chamber wall 17. Between frusto-conical bore 96 and valve bore 98, there is provided a valve seat 100 which communicates with valve seating portion 102 located annularly around valve conical portion 104 whereby a seal is provided between intake pressure chamber 86 and combustion chamber 16. Intake valve conical portion 104 is integral with intake valve stem 106 which extends upwardly through coaxially aligned intake chamber bore 108, mounting ring bore 100, cylindrical ring bore 112 and spring 114.

Intake chamber bore 108, mounting ring bore 110 and guiding ring bore 112 are located within intake pressure chamber wall 92, mounting bracket 120 and guiding ring 122 respectively. Intake chamber bore 108, mounting bracket bore 110 and guiding ring bore 112 have a plurality of intake valve relief holes 124 which communicate with each other and are provided to equalize the pressure between intake pressure chamber 86 and the interior of intake valve piston 118.

Mounting ring 120 is mounted upon intake pressure chamber 86 by welding or other suitable means. Mounting ring 120, further, has an annular portion 126 which extends upwardly from mounting ring 120. Annular portion 126 has inserted and sealingly mounted therein stationary cylinder 130 which is coaxial with valve stem 106 and extends upwardly from mounting ring 120.

Intake valve stem 106 is received within retaining ring coaxial bore 158 located coaxially within retaining ring 156. Retaining ring 156 has radial pin bore 160 at the ends of which there are located countersunk bores 162. A retaining pin 161 is inserted within radial pin bore 160 and through radial valve stem bore 164 thereby connecting retaining ring 156 to the end portion of valve stem 106. The length of retaining pin 161 is shorter than the diameter of retaining ring 156. Spring 114 pushes against retaining ring 156 forcing valve 106 upwardly and thereby also forcing valve seating portion 102 sealingly against valve seat 100.

Intake valve piston 118 is located coaxially within stationary cylinder 130 and has its cylindrical outer surface 132 facing the cylindrical inner surface 134 of stationary cylinder 130. Retaining ring 156 is received within valve piston 118 and is in contact with the inside flat portion 116 of intake valve piston 118. Intake valve piston 118 has on its cylindrical outer surface 132 annular grooves 136 in which are received valve piston rings 138. Valve piston rings 138 are lubricated in a known manner and provide a sliding seal so as to prevent the air/fuel mixture within intake pressure chamber 86 from escaping from the interior of valve piston 118. Intake valve piston 118 further has an outside circular flat portion 140 upon which there is slidingly located ball bearing 142 which is mounted within a socket 141 is intake valve rocker arm 144. Bearing 142 is provided to allow for the horizontal movement of rocker arm 144 with respect to intake valve piston 118 as rocker arm 144 pivots around its pivot point, (not shown). Rocker arm 144 is selectively caused to push downwardly by a control means such as a push rod and cam coupled to power shaft 38 in a conventional manner. Thus, communication between pressure chamber 86 and cylinder 16 is selectively caused to occur depending on the location of power pistons 12 and 14 while also preventing the escape of air and fuel mixture from within pressure chamber 86 into the atmosphere. The opening and closing of the intake valve with respect to the location of power pistons 12 and 14 will be described hereinbelow.

Pressure chamber 86 further has relief opening bore 146 within intake pressure chamber wall 92 for communication with safety relief valve 148 via relief line 147. Safety relief valve 148 can be selectively preset by adjusting the force exerted by spring 150 to opening gate 152 so as to allow for the opening of gate 152 whenever a preset pressure is reached within intake pressure chamber 86. Fuel and air mixture caused to travel through relief valve 148 may be routed through relief line 154 to either the atmosphere or back through the intake air and fuel supply line or both.

Figure 4:
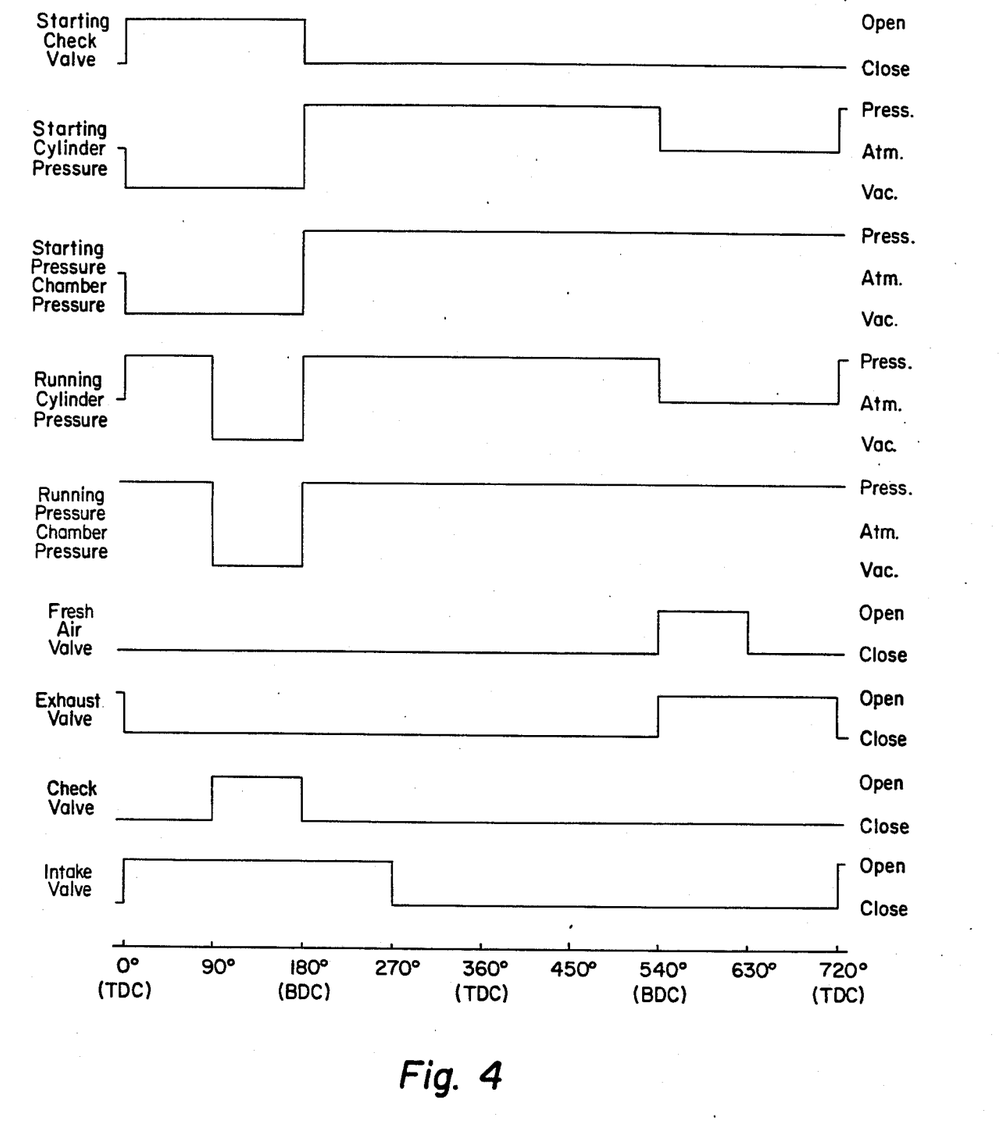
FIG. 4 is a graphical representation showing the position of the intake valve, check valve, exhaust valve and fresh air valve along with the state of the pressures within the pressure chamber and the combustion chamber during a starting cycle and a running cycle.

Referring now to FIGS. 3a–3e and FIG. 4, the operation of internal combustion engine 10 is described by going through one full cycle made up of an intake, compression, power and an exhaust stroke. One full cycle is described herein in degrees and, further, as shown in FIG. 4, 0°–720° represents one full cycle.

As shown in FIG. 4, prior to starting engine 10, it is assumed that combustion chamber 16 and intake pressure chamber 86 are at atmospheric pressure. Zero degrees top dead center position is shown in FIG. 3a and FIG. 4 just prior to the exhaust valve closing. Accordingly, immediately after 0°, the exhaust valve is closed and the intake valve opens. Power pistons 12 and 14 travel away from each other thereby creating a vacuum from 0°–180°. The vacuum during this period causes check valve 94 to open and allow air and fuel mixture to enter pressure chamber 86 and combustion chamber 16. Prior to reaching bottom dead center at 180°, as shown in FIG. 3b, the intake valve is open and air and fuel mixture is allowed to enter pressure chamber 86 and combustion chamber 16. After 180°, power pistons 12 and 14 travel toward each other thereby causing pressurization of the mixture within combustion chamber 16 and pressure chamber 86 thereby also causing check valve 94 to close. From 180° to approximately 270°, the intake valve remains open while check valve 94 remains closed and, thus, a portion of the fuel and air mixture travels from combustion chamber 16 back into pressure chamber 86. At approximately 270°, the intake valve is closed thereby leaving the air and fuel mixture within pressure chamber 86 in a pressurized state. Power pistons 12 and 14 thereafter continue to travel to top dead center or 360° (FIG. 3d) whereat the fuel and air mixture compressed therein is ignited by a sparkplug (not shown) causing the pistons to travel backwards to bottom dead center or 540°.

At 540° or bottom dead center, the exhaust valve and fresh air valve 80 are opened, as shown in FIG. 3e, thereby clearing the spent fuel out of combustion chamber 16 through exhaust chamber 50 and exhaust pipe 58. From 540° to approximately 630°, air valve 80 remains open forcing air within combustion chamber 16 and the exhaust gases therein are assisted in moving out of combustion chamber 16 while fresh air is provided within combustion chamber 16 so as to help combustion during the next cycle. At approximately 630°, air valve 80 is caused to be closed and thereafter power pistons 12 and 14 travel to top dead center or 720° so as to push out any remaining exhaust gases within combustion chamber 16. At this point, the 0°-720° cycle is repeated, however, as shown in FIG. 4, the running combustion chamber and pressure chamber pressures cycle differently.

More specifically, as shown in FIG. 4, after engine 10 has started, pressure chamber 86 will already be in a pressurized state at 0° top dead center. Accordingly, as soon as power pistons 12 and 14 start to move away from each other during the intake stroke after 0°, the intake valve will open and cause the previously pressurized fuel and air mixture within pressure chamber 86 to travel into and supercharge combustion chamber 16. During the intake stroke, substantially between top dead center and bottom dead center, or 90°, a vacuum will again be present in chamber 86 due to the movement of power pistons 12 and 14 away from each other. At that point, check valve 94 will again open and allow air and fuel mixture to flow therethrough. During this running cycle, however, check valve 94 is open only from approximately 90° to 180° or to the point of power pistons 12 and 14 reaching bottom dead center. Thereafter, from 180°-270°, power pistons 12 and 14 will again cause pressure chamber 86 to become pressurized, and at approximately 270° the intake valve will close and power pistons 12 and 14 will continue to top dead center for the next power stroke. The power stroke and exhaust stroke is then repeated as was done in the starting cycle between 360° and 720°.

As can be appreciated, the intake manifold arrangement described above provides a means for supercharging combustion chamber 16 without the use of separate moving gears, impellers or a mechanical pump. Accordingly, the power output and the efficiency of engine 10 are both increased. Furthermore, after engine 10 is warmed up, the air and fuel mixture traveling to within combustion chamber 16 and then back into pressure chamber 86 is caused to be heated by combustion chamber wall 17 and pressure chamber walls 92 thereby causing the fuel to be better vaporized and burn more efficiently and to, further, increase efficiency. By adjusting check valve 94, the point of when air and fuel mixture is allowed to travel to within pressure chamber 86 can be controlled and thus the amount of fuel utilized by engine 10 can also be controlled. The size of pressure chamber 86 can be increased or decreased so as to provide a higher or lower pressurized supercharge, respectively.

Annular portion 126 and stationary cylinder 130 may be provided integrally with pressure chamber walls 92. Furthermore, pressure chamber walls 92 can be provided integrally with combustion chamber wall 17 whereby better heat transfer is provided between combustion chamber wall 17 and pressure chamber walls 92 and thereby also causing better vaporization of the air and fuel mixture.

Retaining ring 156 may be connected to the end portion of valve stem 106 by permanent welding. In the alternative, retaining ring 156 can be eliminated and a bolt can be inserted through valve piston flat portion 140 and threadably received within a threaded hole located axially within valve stem 106. In this embodiment, spring 114 would push directly against valve piston inside flat portion 116.

While the invention has been described as having a specific embodiment, it will be understood that it is capable of further modification. This application is therefore intended to cover any variations, uses or adaptations of the invention following the general principles thereof and including such departures from the present disclosure as come within known or customary practice in the art to which this invention pertains and fall within the limits of the appended claims.

What is claimed is:

1. An internal combustion engine, comprising:
   a combustion chamber having a piston disposed therein;
   a pressure chamber;
   a first intake valve means for providing selective communication between said pressure chamber and said combustion chamber;
   a second valve means for providing selective communicaton between said pressure chamber and a fuel and air mixture supply;
   exhaust valve means for providing selective communication between said combustion chamber and the atmosphere, said exhaust valve means opening during the exhaust stroke of said piston and allowing spent gases to be expelled therethrough and closing at the end of the exhaust stroke;
   an intake control means connected to said first valve means for opening said first valve means during the intake stroke of said piston after said exhaust valve means is closed and maintaining said first valve open during an initial portion of the compression stroke for pressurizing said pressure chamber during the initial portion of the compression stroke and for closing said first valve means during the remaining portion of the compression stroke;
   wherein said second valve means opens during the intake stroke of said piston a period of time after the opening of said first valve means and closes during the compression stroke of said piston,
   a third valve means for providing selective communication between said combustion chamber and a pressurized air supply; and
   air valve control means connected to said third valve means for opening said third valve means during an initial portion of the exhaust stroke after bottom dead center and closing said third valve means during the remaining portion of the exhaust stroke.

2. The engine of claim 1 wherein said means for providing selective communication between said combustion chamber and said pressurized air supply comprises an opening in the combustion chamber substantially halfway between bottom dead center and top dead center piston positions and communicating with said third valve means.

3. An internal combustion engine, comprising:
   a combustion chamber having a piston disposed therein;
   a pressure chamber;
   a first intake valve means for providing selective communication between said pressure chamber and said combustion chamber;
   a second valve means for providing selective communication between said pressure chamber and a fuel and air mixture supply;
   exhaust valve means for providing selective communication between said combustion chamber and the atmosphere, said exhaust valve means opening during the exhaust stroke of said piston and allowing spent gases to be expelled therethrough and closing at the end of the exhaust stroke;

an intake control means connected to said first valve means for opening said first valve means during the intake stroke of said piston after said exhaust valve means is closed and maintaining said first valve open during an initial portion of the compression stroke for pressurizing said pressure chamber during the initial portion of the compression stroke and for closing said first valve means during the remaining portion of the compressions stroke;

wherein said second valve means opens during the intake stroke of said piston a period of time after the opening of said first valve means and closes during the compression stroke of said piston, and wherein said first valve means comprises:

a valve stem extending through said pressure chamber having at one end thereof a valve seating portion for seating on a valve seat located at said communication between said pressure chamber and said combustion chamber;

a stationary cylinder mounted upon said pressure chamber around the other end of said valve stem;

a valve piston surrounding said valve stem located within said stationary cylinder, the outside of said valve piston being pushed by said intake control means;

a spring means within said valve piston adapted for pushing said valve stem so that said valve seating portion is forced against said valve seat; and a sealing means between said valve piston and said stationary cylinder for providing a seal therebetween.

4. The engine of claim 3 wherein said sealing means comprises a plurality of piston rings located between said piston and said stationary cylinder and disposed within annular grooves located in said piston.

5. The engine of claim 3 further comprising a valve guiding ring located around said stem and having a smaller outer diameter than the inside diameter of said vale piston and located between said spring and said pressure chamber, said ring extending to within said valve piston when said valve seating portion is seated against said valve seat, said valve guiding ring having a ring relief hole communicating with said pressure chamber.

6. The engine of claim 3 further comprising relief means communicating with said pressure chamber for allowing said mixture within said pressure chamber to exit therefrom if a preset pressure is reached within said pressure chamber.

7. An internal combustion engine, comprising:
a combustion chamber having disposed therein two opposing pistons adapted to move in opposite directions;
a pressure chamber;
a first intake valve means for providing selective communication between said pressure chamber and said combustion chamber;
a second valve means for providing selective communication between said pressure chamber and fuel and air mixture supply;
exhaust valve means for providing selective communication between said combustion chamber and the atmosphere, said exhaust valve means opening during the exhaust stroke of said pistons and allowing spent gases to be expelled therethrough and closing at the end of the exhaust stroke;

an intake control means connected to said first valve means for opening said first valve means during the intake stroke of said pistons after said exhaust valve means is closed and maintaining said first valve open during an initial portion of the compression stroke for pressurizing said pressure chamber during the initial portion of the compression stroke and for closing said first valve means during the remaining portion of the compression stroke; and wherein said second valve means opens during the intake stroke of said pistons a period of time after the opening of said first valve means and closes during the comrpesison stroke of said pistons.

8. In a four cycle internal combustion engine having a combustion cylinder defining a combustion chamber having a piston disposed therein, an intake manifold arrangement comprising:

a pressure chamber connected to said combustion chamber and a fuel and air mixture intake passage;

a check valve located between said pressure chamber and said intake passage for allowing said mixture to flow only towards said pressure chamber;

an intake valve locateod between said pressure chamber and said combustion chamber;

exhaust valve means for providing selective communication between said combustion chamber and the atmosphere, said exhaust valve means opening during the exhaust stroke of said piston and allowing spent gases to be expelled therethrough and closing at the end of the exhaust stroke;

an intake control means for opening said intake valve during the intake stroke and for closing said intake valve during the compression stroke after the bottom dead center piston position whereby said pressure chamber is pressurized during the compression stroke after the bottom dead center piston position and before closing of said intake valve;

wherein said check valve opens during the intake stroke of said piston a period of time after the opening of said intake valve and closes during the compression stroke of said piston, an air line connected to a hole in said combustion cylinder communicating with said combustion chamber at one end thereof;

an air valve connected to said air line at the other end thereof, said air valve connected to a supply of pressurized air; and an air valve control means for opening said air valve during the exhaust stroke after the bottom dead center piston position and for closing said air valve during the exhaust stroke approximately when the piston reaches said connection between said combustion chamber and said air line.

9. The intake manifold arrangement of claim 8 wherein said air line is connected to said combustion cylinder substantially halfway between bottom and top dead center piston positions.

10. The intake manifold arrangement of claim 7 wherein said intake valve comprises:

a valve stem extending through said pressure chamber having at one end thereof a valve seating portion for seating on a valve seat located at the connection between said pressure chamber and said combustion cylinder;

a stationary cylinder mounted upon said pressure chamber around the other end of said valve stem;

a valve piston surrounding said valve stem and located within said stationary cylinder, an outside portion of said valve piston adapted to be pushed by said intake control means and an inside portion of said valve piston adapted to be in contact with said valve stem;

a spring within said valve piston adapted to push said valve stem outwardly from within said stationary cylinder thereby forcing said valve seating portion against said valve seat when said control means is not pushing against said outside of said valve piston; and a plurality of piston rings located in annular grooves in said valve piston between said valve piston and said stationary cylinder.

11. The intake manifold arrangement of claim 10 further comprising a guiding ring around said stem having a smaller outside diameter than the inside diameter of said valve piston and located between said spring and said pressure chamber, said ring extending to within said valve piston when said valve seat portion is seated against said valve seat and having a ring relief hole communicating with said pressure chamber.

12. The intake manifold arrangement of claim 7 further comprising a relief opening on said pressure chamber connected to a relief valve.

13. A process of supercharging a combustion chamber of an internal combustion engine having a piston disposed in the combustion chamber comprising the steps of:

opening an intake valve for providing communication between said combustion chamber and a pressure chamber during an intake stroke;

creating a vacuum within said combustion chamber and said pressure chamber by the movement of said piston during said intake stroke;

opening a check valve and providing communication between said pressure chamber and a fuel and air supply and allowing fuel and air to be drawn into said pressure chamber and said combustion chamber during said intake stroke;

closing said check valve and compressing said fuel and air within said pressure chamber and said combustion chamber during an initial portion of the compression stroke;

closing said intake valve after said initial portion of said compression stroke and trapping compressed fuel and air in said pressure chamber;

opening an exhaust valve after a power stroke and expelling spent fuel from within the combustion chamber out to the atmosphere;

closing said exhaust valve prior to the next intake stroke;

reopening said intake valve while the check valve remains closed during the next intake stroke and supercharging said combustion chamber with the compressed air and fuel within said pressure chamber, opening an exhaust valve for providing communication between said combustion chamber and the atmosphere; and during the exhaust stroke introducing pressurized air into said combustion chamber substantially halfway between top dead center and bottom dead center piston positions by opening an air valve communication with said combustion chamber and a pressurized air supply.

* * * * *

UNITED STATES PATENT AND TRADEMARK OFFICE
CERTIFICATE OF CORRECTION

PATENT NO. : 4,773,358
DATED : September 27, 1988
INVENTOR(S) : Kenneth E. Heath It is certified that error appears in the above-identified patent and that said Letters Patent is hereby corrected as shown below:

```
Col. 1, line 10, change "pump" to --pumps--;
Claim 5, Col. 9, line 43, change "vale" to --valve--;
Claim 7, Col. 10, line 15, change "comrpesison" to
     --compression--;
Claim 8, Col. 10, line 25, change "locateod" to --located--.
```

Signed and Sealed this

Fourteenth Day of February, 1989

Attest:

DONALD J. QUIGG

*Attesting Officer*     *Commissioner of Patents and Trademarks*